UNITED STATES PATENT OFFICE.

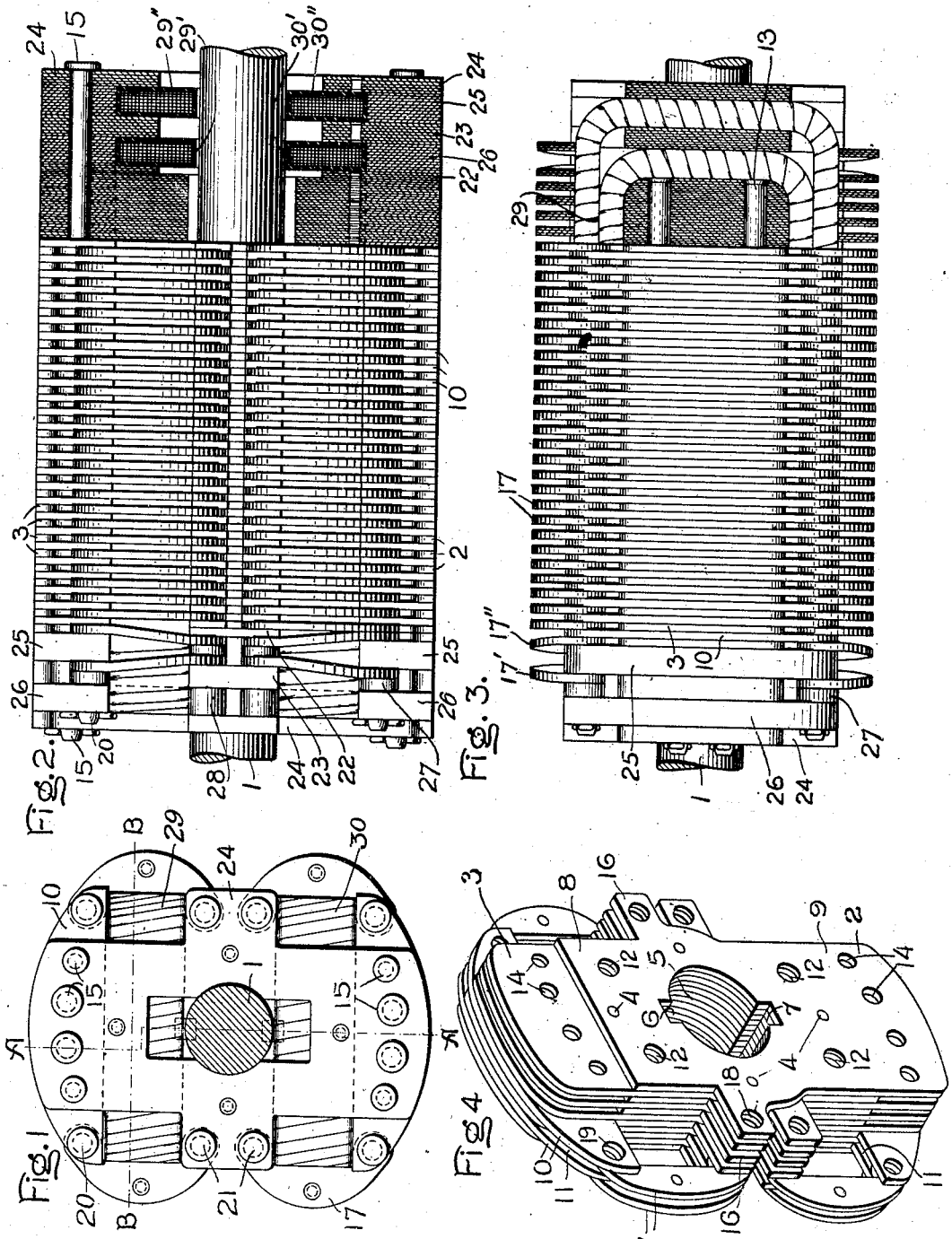

HENRY G. REIST, OF SCHENECTADY, NEW YORK, ASSIGNOR TO GENERAL ELECTRIC COMPANY, A CORPORATION OF NEW YORK.

DYNAMO-ELECTRIC MACHINE

No. 896,322.  Specification of Letters Patent.  Patented Aug. 18, 1908.

Application filed July 10, 1903. Serial No. 164,959.

*To all whom it may concern:*

Be it known that I, HENRY G. REIST, a citizen of the United States, residing at Schenectady, in the county of Schenectady and State of New York, have invented certain new and useful Improvements in Dynamo-Electric Machines, of which the following is a specification.

The object of my present invention is to improve the construction and operation of dynamo-electric machines. More particularly the object of my invention is to improve the construction of the field member of a dynamo-electric machine.

When dynamo-electric machines are run at high speeds, such for instance as frequently occur when they are directly connected to steam turbines, difficulties may be experienced by reason of the speed at which they are run. For instance, the centrifugal forces created may cause a change in shape of portions such as the windings and thus produce a consequent unbalancing of the machine.

My invention contemplates among other things certain features of construction and arrangement by which a very simple and efficient organization is produced which will stand high speeds without injurious effects.

The various features of novelty which characterize my invention will be pointed out in the claims annexed to and forming part of this specification.

For a better understanding of my invention reference may be had to the accompanying drawing in which I have illustrated the rotating field member of a dynamo-electric machine embodying one form of my invention.

Of the drawings Figure 1 is an end elevation of the rotating member of a dynamo-electric machine embodying my invention, of which Fig. 2 is a side elevation partly sectioned on the line A A of Fig. 1; Fig. 3 is a plan view partly sectioned on the line B B of Fig. 1; and Fig. 4 is a perspective view showing a partially constructed field member and the method of assembling the various parts.

Referring to the drawings, 1 represents the shaft upon which the revolving field member is mounted. The body of the revolving member is formed of a number of layers or sections 2 and 3. These layers or sections are formed of magnetic material such as soft iron or mild steel and each layer or section consists preferably of a bundle of laminæ connected together by rivets 4. The sections 2 and 3 are exactly similar in construction, being formed from the same sort of punchings assembled in the same manner.

Each section is substantially rectangular and is provided with an aperture 5 through which the shaft 1 passes and with key-ways 6 and 7 which operate in conjunction with suitable keys to prevent relative rotation between the shaft and sections 2 and 3. The aperture 5 divides each section or layer into two parts or portions 8 and 9. The portions 8 and 9 are of unequal extent, the portion 9 being the longer. As shown, the outer end of the portion 9 is curved concentrically with the axis of the shaft 1; the end of the portion 8 however is straight. In assembling the sections 2 and 3 on the shaft, one set of sections is reversed with respect to the other so that the longer portions of the sections 2 extend in one direction while the longer portions of the section 3 extend in the opposite direction.

The sections 2 and 3 alternate along the shaft. As a consequence the outer ends of the longer portions of the sections 2 are separated by spaces, the thickness of a space being equal to the thickness of the section 3 and the radial extent of the space being equal to the difference in the length of the long and short portions of the sections 2 and 3. Similar spaces exist between the ends of the longer portions 3. In the form of my invention which I have illustrated in the drawing, these spaces are filled by segmentally-shaped pole tip members 10. Each member 10 consists preferably of a bundle of sheets of magnetic material which are shaped so as to project flush with the outer edges of the extending longer portions 9 of the sections 2 and 3 but are of a length such that the ends of the tip member project beyond the sides of the sections 2 and 3. As a consequence spaces 11 are formed between the ends of the pole tips which extend transversely to the pole face. This has the effect of increasing the reluctance at the tips of the pole pieces, a desirable feature, as is well understood by those skilled in the art.

The sections 2 and 3 are provided with apertures 12. The apertures 12 are arranged in two pairs, one pair in each end or portion of each section, and are so arranged that when the sections 2 and 3 are assembled the holes in the short end of one section will register with the holes in the long end of the adjacent section, and vice versa. Bolts or rivets 13 pass through these openings and form a means for securing together the sections 2 and 3 composing the body of the rotating field member.

The outer ends of the extending longer portions of the sections 2 and 3 are provided with apertures 14 which register with similar apertures formed in the pole tip members 10. Bolts or pins 15 pass through these apertures in a direction parallel to the shaft 1 and detachably secure the pole tips 10 in place.

Each section 2 and 3 is provided with a pair of similar and similarly located laterally-extending wings or projections 16. These wings or extensions are at one side of a line passing through the center of the aperture 5, the wings or projections being toward the shorter end of each section. As a result when the sections 2 and 3 are assembled the projecting wings or extensions 16 are arranged in two sets, those carried by the sections 2 being separated by a plane passing through the axis of the shaft 1 from those carried by the section 3. With this arrangement spaces are left between the wings or projections 16 which correspond with the spaces between the projecting ends of the corresponding pole tip sections 10. Links or members 17 formed of non-magnetic material, preferably each consisting of a bundle of punchings of phosphor bronze or the like, are placed so that one end of each link projects into the space between a pair of pole tip members 10 and a pair of wings 16. This construction is clearly shown in Figs. 2 and 4. Registering apertures 18 and 19 are formed in the ends of the links 17 and wings 16, and links 17 and projecting ends of the tip 10 respectively. Bolts or pins 20 and 21 pass through these apertures and secure the links 17 in place.

Preferably members 22, 23 and 24 are employed at each end of the rotating member. The outline of the member 24, as is clearly shown in Fig. 1, is substantially that of the combined outlines of the members 2 and 3 as they appear when assembled. The members 22 and 23 are similar in outline to the member 24 but may differ in thickness from each other and from the member 24. In practice the members 23 and 24 are considerably thicker than the sections 2 and 3. Preferably these members are each composed of bundles of similar punchings or laminæ of mild steel or the like riveted together.

In assembling the parts, the members 2 and 3 are preferably clamped between the members 22 by the rivets 13 which pass through apertures formed for the purpose in the members 20 and which terminate at the outer surfaces of said members.

The members 23 and 24 are so placed that spaces exist between the members 22 and 23 and the members 23 and 24 respectively for a purpose to be hereinafter mentioned. Tip portions 25 and 26 similar in shape to the pole tip members 10 but differing therefrom in thickness are placed between the members 22 and 23 and 23 and 24 respectively. The members 22, 23 and 24 are formed with apertures which register with the apertures 14 and 18 in the members 2 and 3 and the bolts or pins 15 and 20 pass through these members as well as through the members 2 and 3. Link members 17' and 17'' similar in general to the links 17 extend from each side of each end of each tip piece 25 into the space between the lateral extensions of the members 22 and 23. As is clearly shown in the drawings, these links are bent in the direction of their length in order that they may assume proper positions. Suitable space blocks 27 and 28 are employed for the purpose of obtaining a proper assembly of the parts.

The tip pieces 25 and 26 are formed with apertures which register with the apertures 18 of the links 17 and tip pieces 10 and the bolts or pins 21 pass through these apertures. Preferably the pins 13, 20 and 21 are formed with heads at one end and with apertures at the other end through which cotter pins are passed to prevent the bolts from slipping out of their operative positions.

The projecting ends of the tips 10, the links 17, and the extensions or wings 16 in the bodies of the sections 2 and 3, form four coil-receiving spaces. When the parts are shaped as shown in the drawings these coil-receiving spaces are rectangular and receive coils 29 and 30 which serve to create a magnetic flux giving the longer ends of the sections 2 one polarity and the longer ends of the sections 3 the opposite polarity. It will be observed in this connection that each section 2 and 3 forms a part of the two pole pieces of the machine.

The coils 29 and 30 are similar in construction and each consists of two sections 29' 29'', and 30' 30'' respectively. The sections 29'' and 30'' surround the sections 29' and 30' respectively. The end of the coil sections 29' and 30' are placed between the members 22 and 23 and the ends of the coil sections 29'' and 30'' are placed between the members 23 and 24, the spaces between the members 22 and 23 and 23 and 24 respectively being just sufficient for the purpose. The coils are divided in order to allow of a readier formation and manipulation of them.

With the arrangement described the whole construction is made symmetrical. The coils are prevented from moving radially off of the pole pieces by the pole tip members 10 and the members 25 and 26. The end turns or connections of the coils or windings are held forcibly against the body of the core and prevented from distortion or displacement in a direction parallel to the shaft 1 by the end members 24. The members 24 also serve as end covers to protect the end connections against mechanical injury. The members 23 serve as spacing blocks for separating the end turns or connections of the sections into which each coil or winding is divided. As the sides and ends of the coils are firmly locked in place they cannot be thrown out of position by the centrifugal forces generated and thereby produce an unbalancing of the mechanism. The spaces between the links 17 and wings are sufficient to insure a proper ventilation of the coils.

The construction employed allows a ready removal of the coils whenever it may become desirable. All that is necessary is to remove the pole tip members 10 and spread the retaining members 17. This necessitates merely the withdrawal of the pins 15 and 20.

While I have described the best form of my invention now known to me, it will readily be understood that modifications in the form of the invention described can be made without departing from its spirit.

What I claim as new and desire to secure by Letters Patent of the United States, is,

1. In a dynamo-electric machine, a pole piece having spaces formed in its tips extending transversely to the face of the pole piece, a coil surrounding said pole piece and non-magnetic coil-retaining members entering said spaces and engaging the periphery of said coil.

2. In a field magnet, a laminated pole piece having removable tips, a coil surrounding said pole piece, and a retaining member or members therefor engaging the periphery of said coil and mounted upon said pole tips to hold said coil in place against centrifugal force.

3. A bi-polar field magnet structure formed of similar laminæ, each of said laminæ having a substantially rectangular long polar portion and a substantially rectangular short polar portion, some of said laminæ being reversed with respect to the others.

4. A field magnet composed of similar unsymmetrical sections assembled with alternate sections reversed with respect to the intermediate sections, pole tip members placed between said alternate sections, and coil-retaining members connected to pole tip members and to sections.

5. A field magnet having its pole pieces formed of alternately placed long and short portions, pole tip members placed between the long portions, and coil-retaining members entering the space between the ends of the pole tip members.

6. In a field magnet, a laminated pole piece, a coil surrounding said pole piece, and a plurality of parallel coil retaining members engaging the periphery of said coil and connected to the pole piece to hold said coil in place against centrifugal force.

7. In a field magnet, a laminated pole piece, a coil surrounding said pole piece, and a coil retaining member or members therefor entering spaces formed for the purpose in the pole piece at each side of the coil, said coil retaining member engaging the periphery of said coil to hold it in place against centrifugal force.

8. A field magnet having its poles made up of long portions and short portions, said short portions being provided with wings, projecting pole tip members located between the long portions, and coil-retaining members entering the spaces between adjacent wings and between adjacent pole tip members.

9. A field magnet made up of similar sections, each section having a short polar portion and a long polar portion, said sections being assembled so that the long portions in each pole are separated by short portions, pole tip members located between the long portions, and coil-retaining members entering the spaces between said pole tip members.

10. In combination, a pole piece comprising a body portion and pole tip members, and coil-retaining members, said coil-retaining members being connected at one of their ends to the pole tip member and at the other of their ends to the body of the pole piece.

11. In a field magnet, a pole piece having coil receiving channels, and a magnetizing coil therefor formed in sections, one of said sections surrounding the other, said sections being separated at their ends by a portion of the pole piece and being together in the coil receiving channels.

12. In a field magnet, a laminated pole piece comprising pole tip members and a body portion, said body portion and pole tip members forming a coil receiving chamber, a coil surrounding said pole piece, and a coil retaining member or members connected to said pole tip members and said body portion and engaging the periphery of the coil to hold it in place against centrifugal force.

13. In a dynamo-electric machine, a pole piece formed of laminæ, spaces between some of the laminæ, a coil surrounding said pole piece and one or more non-magnetic coil-retaining members entering said spaces and engaging the periphery of said coil.

14. In a dynamo-electric machine, pole pieces comprising body portions and tip members, coil-retaining members, and means for detachably connecting the tip members to the body portion and to the coil-retaining members.

15. In a dynamo-electric machine, a laminated pole piece and laminated non-magnetic coil-retaining members, the laminæ of the pole piece and the laminæ of the coil-retaining members being connected together.

16. In a dynamo-electric machine, a pole piece composed of laminæ, a coil surrounding the pole piece, and coil retaining members extending substantially parallel to the axis of said pole piece, secured to said pole piece at their ends and engaging the periphery of said coil to hold it in place against centrifugal force.

17. In a field magnet, a mass of magnetic material having a coil-receiving groove or channel formed in it, a coil or coils located in said groove or channel, and laminæ of non-magnetic material coöperating with the magnetic material to form a closed metallic circuit about the coil.

18. In a field magnet, a laminated pole piece formed of bundles of laminæ, a coil surrounding said pole piece, and a plurality of coil retaining members engaging the outside of the coil and having their ends secured between alternate bundles of laminæ which go to make up the pole piece.

19. In a field magnet, a laminated pole piece formed of bundles of laminæ and having pole tip members and projecting wings, said pole tips and wings having spaces formed therein, a coil surrounding said pole piece, and a plurality of coil retaining members engaging the outside of the coil and having their ends secured in said spaces.

In witness whereof, I have hereunto set my hand this 6th day of July, 1903.

HENRY G. REIST.

Witnesses:
BENJAMIN B. HULL,
HELEN ORFORD.